(12) United States Patent
Kuwabara et al.

(10) Patent No.: US 7,308,544 B2
(45) Date of Patent: Dec. 11, 2007

(54) STORAGE CONTROL APPARATUS, STORAGE SYSTEM, AND CONTROL METHOD FOR STORAGE SYSTEM

(75) Inventors: Hiroshi Kuwabara, Ninomiya (JP); Yoshio Mitsuoka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/298,469

(22) Filed: Dec. 12, 2005

(65) Prior Publication Data

US 2006/0090047 A1 Apr. 27, 2006

Related U.S. Application Data

(63) Continuation of application No. 10/795,435, filed on Mar. 9, 2004, now Pat. No. 7,058,772.

(30) Foreign Application Priority Data

Dec. 1, 2003 (JP) ............... 2003-401417

(51) Int. Cl.
*G06F 12/00* (2006.01)
(52) U.S. Cl. ............... 711/154; 711/161; 711/159; 707/2; 707/204
(58) Field of Classification Search ............... 711/154, 711/161, 162, 159; 707/2, 204, 102
See application file for complete search history.

(56) References Cited

U.S. PATENT DOCUMENTS 5,991,753 A * 11/1999 Wilde ............... 707/2

2002/0138610 A1 9/2002 Miyazawa et al.
2002/0138642 A1 9/2002 Miyazawa et al.

(Continued)

FOREIGN PATENT DOCUMENTS

WO WO 02/25445 B2 9/2001

OTHER PUBLICATIONS

European Search Report date Oct. 12, 2005.

(Continued)

*Primary Examiner*—Kimberly Mclean
(74) *Attorney, Agent, or Firm*—Reed Smith LLP; Stanley P. Fisher, Esq.; Juan Carlos A. Marquez, Esq.

(57) ABSTRACT

In a storage control apparatus employed in a storage system arranged by containing a plurality of storage control apparatus connected via an IP (Internet Protocol) network to each other, the storage control apparatus stores thereinto necessary storage expiration equal to such an expiration during which data is required to be stored under safe condition, this data being stored in a first storage area of the storage control apparatus; stores thereinto first guarantee expiration equal to such an expiration during which the first storage area can store the data under normal condition; and stores thereinto second guarantee expiration equal to such an expiration during which a second storage area can store the data under normal condition, this second storage area being equal to a storage area of another storage control apparatus. When the necessary storage expiration of the first storage area is expired after the first guarantee expiration of this first storage area, the storage control apparatus transfers the data stored in the first storage area to the second storage area having the second guarantee expiration expired after the first guarantee expiration.

19 Claims, 9 Drawing Sheets

U.S. PATENT DOCUMENTS

2003/0204690 A1 10/2003 Yamada et al.
2004/0024954 A1  2/2004 Rust
2004/0205112 A1 10/2004 Margolus
2004/0215589 A1 10/2004 Boyd et al.
2005/0149748 A1* 7/2005 Spry et al. .................. 713/200

OTHER PUBLICATIONS

Brian Ritchie, "Beyond HSM: Data Management in the Native Environment", Computer Technology Review (Sep. 12, 1993), No. 11, pp. 46-49.

* cited by examiner

FIG. 5

| APPARATUS ID 531 | LOGICAL UNIT (LUN) 532 | EMULATION TYPE 533 | STORAGE CAPACITY (GB) 534 | FORMAT DAY/TIME 535 | GUARANTEE TERM (YEAR) 536 | EXPIRATION OF GUARANTEE 537 |
|---|---|---|---|---|---|---|
| H1 | 0001 | OPEN01 | 5 | 2003/12/05 | 5 | 2008/12/5 |
| H1 | 0002 | OPEN02 | 10 | 2003/12/05 | 5 | 2008/12/5 |
| H2 | 0003 | MAINFRAME01 | 20 | 2000/10/10 | 7 | 2007/10/10 |
| H2 | 0004 | MAINFRAME02 | 20 | 2000/10/10 | 7 | 2007/10/10 |
| H2 | 0005 | OPEN01 | 5 | 2000/10/10 | 7 | 2007/10/10 |
| ......... | ......... | ......... | ......... | ......... | ......... | ......... |

500

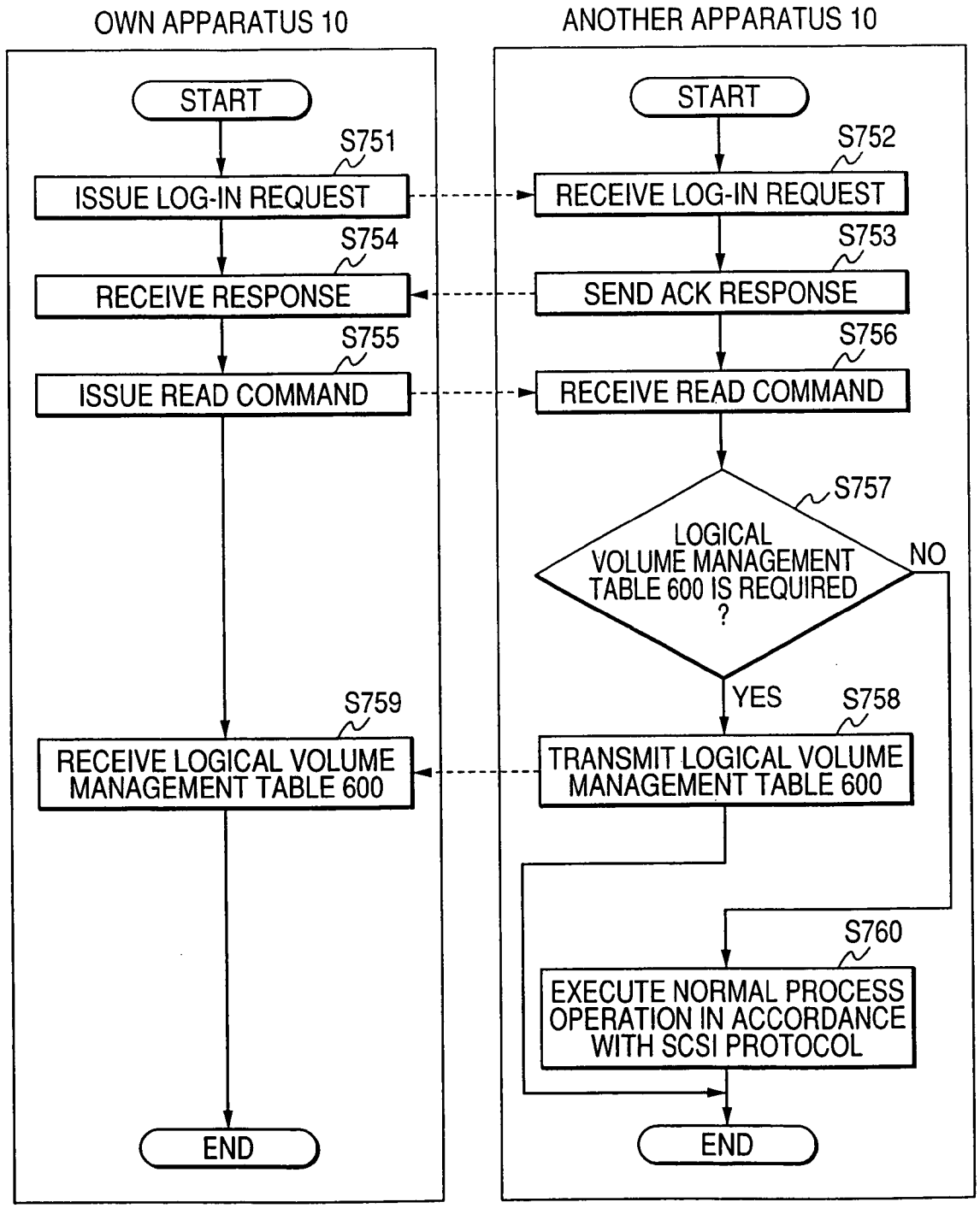

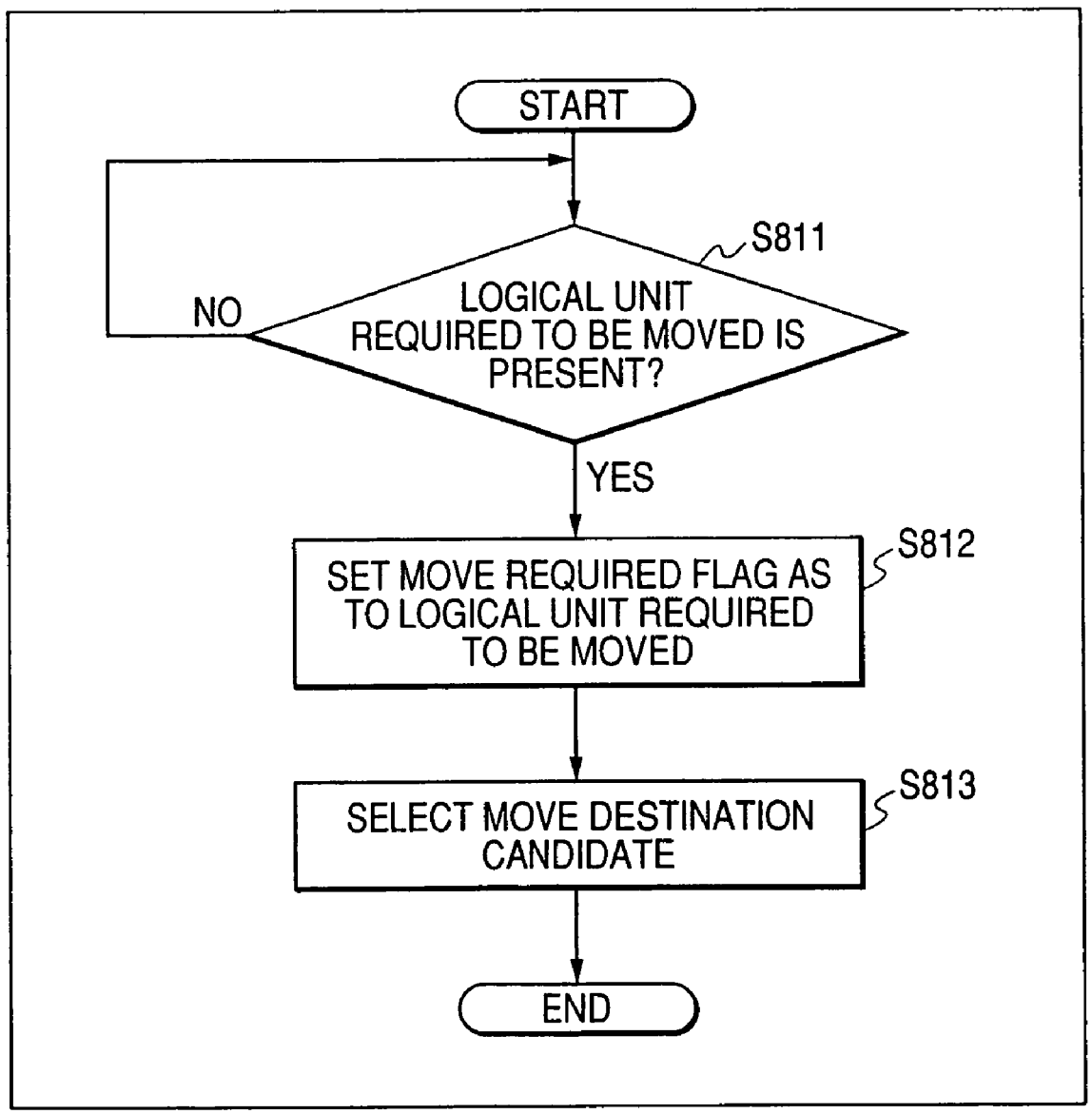

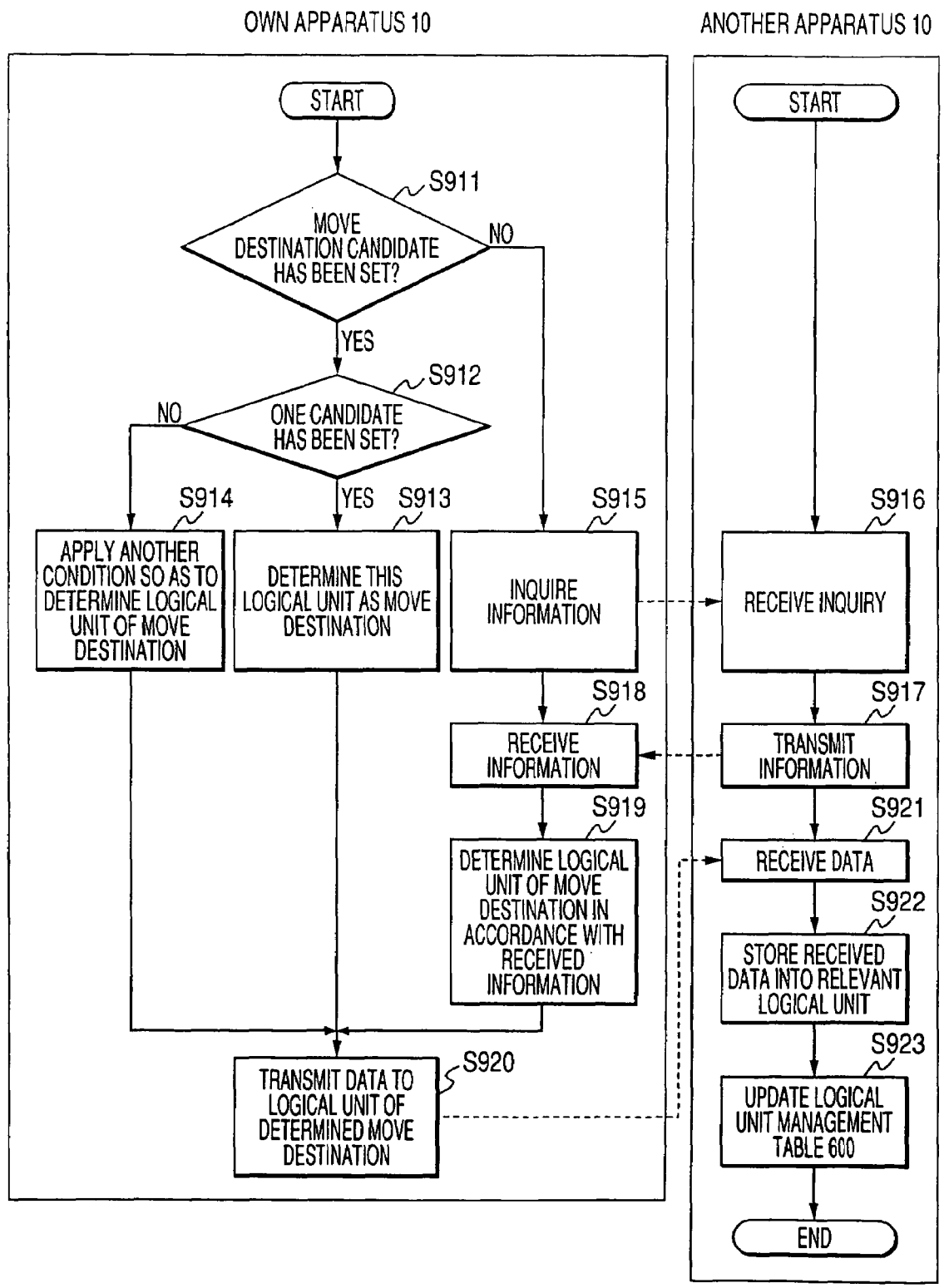

STORAGE CONTROL APPARATUS, STORAGE SYSTEM, AND CONTROL METHOD FOR STORAGE SYSTEM

CROSS-REFERENCES TO RELATED APPLICATIONS

This application is a Continuation of U.S. application Ser. No. 10/795,435 filed on Mar. 9, 2004 now U.S. Pat. No. 7,058,772 which claims priority from Japanese Patent Application No. 2003-401417, filed on Dec. 1, 2003, which is incorporated herein by reference in its entirety.

BACKGROUND OF THE INVENTION

1. Field of the Invention

The present invention is related to a storage control apparatus, a storage system, and a control method for controlling the storage system.

2. Description of the Related Art

In connection with development in IT (Information Technology) industries, storage control apparatus have been rapidly popularized, among which disk array apparatus are typically known. Storage control apparatus have been firmly utilized as major infrastructure in order to realize storage system employed in information service centers, data centers and the like in enterprises. In current storage product markets, specific attentions have been paid to virtualization of storage systems. That is, while a plurality of storage control apparatus are connected via a network to each other under communicatable condition, since the entire storage system is managed in a unification manner, resources held in the respective storage control apparatus may be effectively used (see JP-A-2002-288105).

On the other hand, among data which are managed in storage systems, there are such data which are required to be stored during a predetermined term due to natures of these data. For instance, data of account books in accounting systems and clinical histories in medial business systems must be stored for predetermined terms due to legal responsibility. Although there is no such a legal responsibility, preselected data should be stored for a predetermined term because of rules employed in organization. For example, in customer managing systems, customer data and sales data must be stored for a long time duration due to a purpose of history management.

In order to store data which are required for such a long preservation, for example, these data are stored into storage media such as magnetic tapes for back-up purposes at proper timing. However, storage media such as magnetic tapes own the following problems. That is, generally speaking, such storage media necessarily require lengthy data reading/writing time, so that rapid data processing operations could not be realized. Further, in order to read/write data with respect to such a storage media, e.g., magnetic tapes, data reading/writing apparatus are required. There is another problem as to managing workloads of such data reading/writing apparatus, and cost matters thereof. Also, since both a place for storing the storage media and a place for installing data reading/writing apparatus must be secured, there is a further problem that spaces cannot be effectively utilized.

SUMMARY OF THE INVENTION

The present invention has been made to solve these problems, and therefore, has an object to provide a storage control apparatus, a storage system, and a control method for controlling the storage system, capable of managing data under safe condition.

To achieve the above-described object, a storage control apparatus, according to a major aspect of the present invention, is featured by such a storage control apparatus for reading/writing data with respect to a storage device in response to a data input/output request transmitted from an information processing apparatus, which is used in a storage system arranged by containing a plurality of storage control apparatus which are connected via an IP (Internet Protocol) network to each other under communicatable condition, comprising: a necessary storage expiration managing unit for storing thereinto a necessary storage expiration equal to such an expiration during which data is required to be stored under safe condition, the data being stored in a first storage area corresponding to a storage area of the storage device to which the storage control apparatus reads/writes the data; a first guarantee expiration managing unit for storing thereinto first guarantee expiration equal to an expiration during which the first storage area can store the data under normal condition; a second guarantee expiration managing unit for storing thereinto a second guarantee expiration equal to such an expiration during which a second storage area can store the data under normal condition, the second storage area being equal to a storage area of the storage device to which another storage control apparatus contained in the storage system reads/writes the data; and a data move managing unit operated in such a manner that when the necessary storage expiration of the first storage area is expired after the first guarantee expiration of the first storage area, the data move managing unit selects the second storage area having the second guarantee expiration expired after the first guarantee expiration within the second storage area of said another storage control apparatus, and transfers the data stored in the first storage area to the selected second storage area.

In accordance with the present invention, it is possible to provide such a storage control apparatus capable of managing the data under the safe condition, and also possible to provide the storage system and the method of controlling this storage system.

BRIEF DESCRIPTION OF THE DRAWINGS

For a better understanding of the present invention, reference is made of a detailed description to be read in conjunction with the accompanying drawings, in which:

FIG. 5 is a diagram for indicating a move destination logical unit management table 500 explained as an embodiment of the present invention;

FIG. 7B is a flow chart for describing an example of a process operation which is carried out in accordance with an iSCSI protocol when the own disk array apparatus 10 explained as an embodiment of the present invention acquires a portion of information registered in either the logical unit management table 600 from another disk array apparatus 10 or information registered in the logical unit management table 600;

FIG. 8 is a flow chart for explaining both a process operation for judging as to whether or not move of data stored in the logical unit is required, and another process operation for describing that, as to such a logical unit into which the data being judged to be moved has been stored, a logical unit which may constitute a move destination candidate is selected, as explained as an embodiment of the present invention; and FIG. 9 is a flow chart for explaining a process operation related to move of data, described as an embodiment of the present invention.

DETAILED DESCRIPTION OF THE PREFERRED EMBODIMENTS

Referring now to drawings, an embodiment of the present invention will be described.

Figure 1:
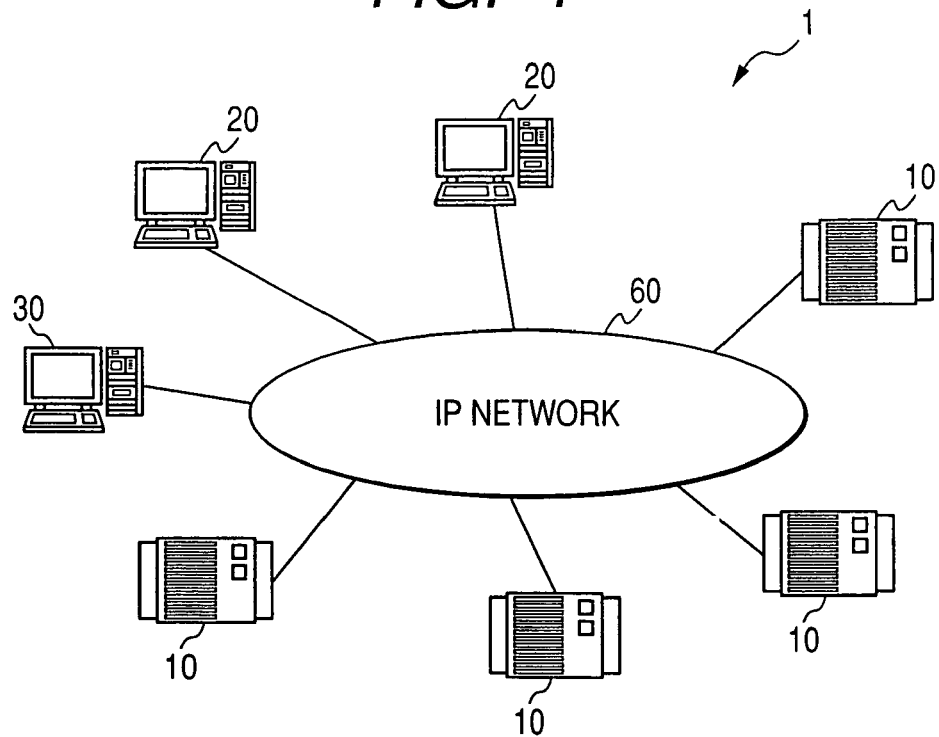
FIG. 1 schematically indicates an arrangement of a storage system 1 explained as an embodiment of the present invention.

FIG. 1 schematically shows an arrangement of a storage system 1 which is explained as an embodiment of the present invention. This storage system 1 is arranged by containing a plurality of disk array apparatus 10 (namely, storage control apparatus), and one set, or more sets of information processing apparatus 20. Both the disk array apparatus 10 and the information processing apparatus 20 are connected to a communication network (will be referred to as "IP network 60" hereinafter), and thus, the respective disk array apparatus 10 and the information processing apparatus 20 are brought into communicable conditions among them. The IP network 60 employs as a communication protocol, the TCP/IP (Transmission Control Protocol/Internet Protocol) (registered trademark) protocol.

Structure of Information Processing Apparatus

The information processing apparatus 20 corresponds to a computer, for instance, a personal computer, a workstation, a server, a main frame, and the like.

Figure 2:
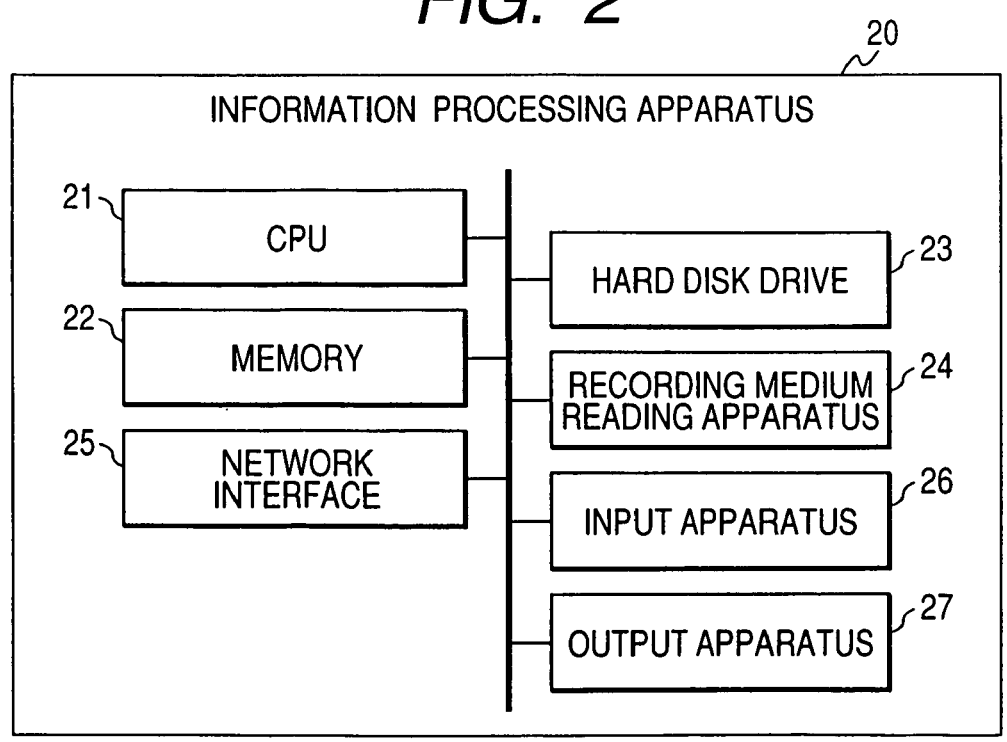
FIG. 2 is a diagram for showing a hardware structure of an information processing apparatus 20 described as an embodiment of the present invention.

FIG. 2 illustratively indicates a hardware structure of the information processing apparatus 20. The information processing apparatus 20 is arranged by employing a CPU (Central Processing Unit) 21, a memory (ROM, RAM) 22, a hard disk drive 23, a recording medium reading apparatus 24, a network interface 25, an input apparatus 26, and an output apparatus 27. The recording medium reading apparatus 24 reads data and a program from a recording medium such as a CD-ROM and a DVD-ROM. The input apparatus 26 corresponds to a keyboard, a mouse, and the like. The output apparatus 24 corresponds to a display, a printer, and the like. The network interface 25 performs a communication between the disk apparatus 10 and other information processing apparatus 20 via the IP network 60 in accordance with the TCP/IP protocol. The disk array apparatus 10 functions as a storage used for data which is processed by an application program, and the like, which are executed in the information processing apparatus 20. The information processing apparatus 20 transmits a data input/output request by way of a block designation to the disk array apparatus 10.

It should be noted that the disk array apparatus 10 may also function as an NAS (Network Attached Storage) which accepts a data input/output request by way of a file name designation from the information processing apparatus 20 in accordance with such a protocol as NFS (Network File System). In the case that the disk array apparatus 10 functions as such an NAS, the above-described data input/output request corresponds to the data input/output request by the file name designation, and a file name is set to the above-described data input/output request as such an information used to specify data stored in a storage device. When the present invention is embodied, other storage control apparatus such as semiconductor disk apparatus may be employed instead of the disk array apparatus 10.

Structure of Disk Array Apparatus

The disk array apparatus 10 receives a data input/output request which is transmitted from the information processing apparatus 20 via the IP network 60. The data input/output request corresponds to, for instance, a request for reading data (data reading request) and a request for writing data (data writing request). The disk array apparatus 10 performs to read and write data with respect to a storage device in response to a received data input/output request.

Figure 3:
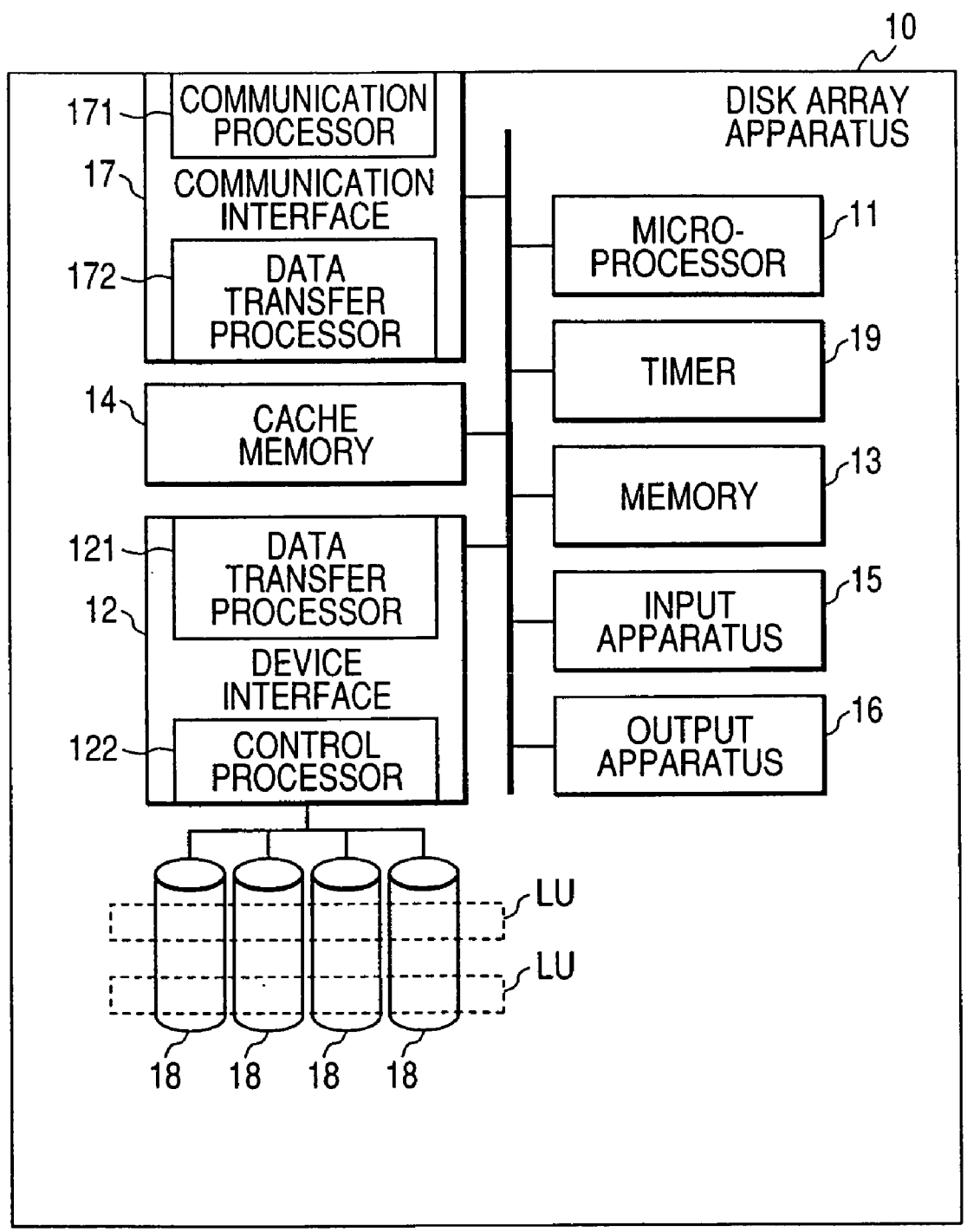
FIG. 3 is a diagram for representing a hardware structure of a disk array apparatus 10 explained as an embodiment of the present invention.

FIG. 3 shows a hardware structure of the disk array apparatus 10. The disk array apparatus 10 is equipped with a microprocessor 11, a device interface 12, a memory (RAM, ROM) 13, a cache memory 14, an input apparatus 15 such as an operation panel, an output apparatus 16 such as a display, a communication interface 17, a hard disk device 18 functioning as a storage device, a timer 19 for producing present day/time, and the like. The hard disk drive 18 may be stored in the same housing into which other structural elements of the disk array apparatus 10 are stored, or may be alternatively stored in another housing which is different from the first-mentioned housing.

The communication interface 17 receives a data input/output request which is transmitted from the information processing apparatus 20 via the IP network 60, and notifies the received data input/output request to the microprocessor 11. The communication interface 17 is arranged by containing a communication processor 171, and a data transfer processor 172. The communication processor 171 is communicated via the IP network 60 with respect to the information processing apparatus 20 and another disk array apparatus 10. The communication processor 171 is communicated with another disk array apparatus 10 via the IP network 60 in accordance with an iSCSI (Internet Small Computer System Interface) protocol (see, for example, RFC (Request for Comments) 3347).

The data transfer processor 172 is realized by employing, for instance, a DMA (Direct Memory Access) processor. The data transfer processor 172 performs a data transfer operation in a high efficiency between the communication interface 17 and the cache memory 14. In a case that the above-described data input/output request received from the information processing apparatus 20 corresponds to a data writing request, the communication interface 17 receives the write data transmitted from the information processing apparatus 20, and then writes this write data into the cache memory 14. In such a case that the above-described data input/output request received from the information processing apparatus 20 corresponds to a data reading request, the communication interface 17 reads the read data which has been written into the cache memory 14, and then transmits the read data to the information processing apparatus 20.

The microprocessor 11 controls an entire arrangement of the disk array apparatus 10 in a unification manner. The microprocessor 11 may realize various sorts of functions which are provided by the disk array apparatus 10 by executing a program stored in the memory 13. When the communication interface 17 writes the write data into the cache memory 14, the microprocessor 11 notifies this data writing operation to the device interface 12. When the device interface 12 writes the read data into the cache memory 14, the microprocessor 11 notifies this data writing operation to the communication interface 17.

Both the memory 13 and the cache memory 14 are constituted by employing a RAM, or the like. The memory 13 is used as a storage place of data supplied from the microprocessor 11. The cache memory 14 may play a role of buffering an access speed with respect to the hard disk drive 18, and may improve a response speed with respect to the information processing apparatus 20.

The device interface 12 is arranged by containing a control processor 121 and a data transfer processor 122. The control processor 121 controls an entire structure of the device interface 12 related to the data reading/writing operations with respect to the hard disk drive 18. The device interface 12 may be provided with a function for controlling the hard disk drive 18 based upon a RAID level, for instance, 0, 1, and 5 in the RAID (Redundant Array of Inexpensive Disks) system. In a case that the device interface 12 receives a command from the communication interface 17, the control processor 122 reads and writes data with respect to the hard disk drive 18 in accordance with the received command. In a case that the above-described command corresponds to a command for instructing a data reading operation from the hard disk drive 18, the device interface 12 reads the data from the hard disk drive 18 in response to the data reading command, and then, writes the read data into the cache memory 14. In the case that the above-described command corresponds to a command for instructing a data writing operation with respect to the hard disk drive 18, the device interface 12 reads the data which has been written in the cache memory 14, and then, writes the read data into the hard disk drive 18.

Logical Unit

The information processing apparatus 20 recognizes a storage area provided by the disk array apparatus 10, while a logical unit "LU" (Logical Unit) corresponding to a logical storage area is used as a unit. In a case that the operating system installed in the information processing apparatus 20 corresponds to such an operating system of the UNIX (registered trademark), the logical unit is defined in correspondence with a device file (Device File). In such a case that the operating system installed in the information processing apparatus 20 corresponds to an operating system of the Windows (registered trademark), the logical unit is defined in correspondence with a drive letter (drive name, drive identifier). To the respective logical units, logical unit numbers "LUNs" (Logical Unit Numbers) specific to the respective logical units have been applied. An LUN is set to, for example, a data input/output request transmitted from the information processing apparatus 20 to the disk array apparatus 10, and, the information processing apparatus 20 designates the LUN so as to specify the logical unit. Also, the disk array apparatus 10 recognizes a physically-set storage area (will be referred to as "physical storage area" hereinafter) of the hard disk drive 18, while such a logical device LDEV (Logical Device) corresponding to a storage area which is logically set by using this storage area is used as a unit. For example, one, or more sets of parity groups in the RAID5 system may correspond to one logical device.

Management of Data and Storage Expiration

The disk array apparatus 10 is provided with a system capable of holding data under safe condition which has been stored in the hard disk drive 18 as to a required term. To realize the above-described system, each of the disk array apparatus 10 manages such information as to necessary storage expiration, first guarantee expiration, second guarantee expiration, and the like. The necessary storage expiration is an expiration that data which has been stored in the storage area provided by the hard disk drive 18 is required to be held under safe condition. The first guarantee expiration corresponds such an expiration capable of guaranteeing that a logical unit (first logical unit, first storage area) stores therein data under normal condition. Also, the second guarantee expiration corresponds to an expiration capable of guaranteeing that another logical unit (second logical unit, second storage area) of another disk array apparatus 10 connected to the IP network 60 stores therein data under normal condition. As the first guarantee expiration and the second guarantee expiration, for instance, a life period of the hard disk drive 18 is used. Also, as the first guarantee expiration and the second guarantee expiration, for example, a life period of the disk array apparatus 10 may be employed, which manages this logical unit.

Figure 4:
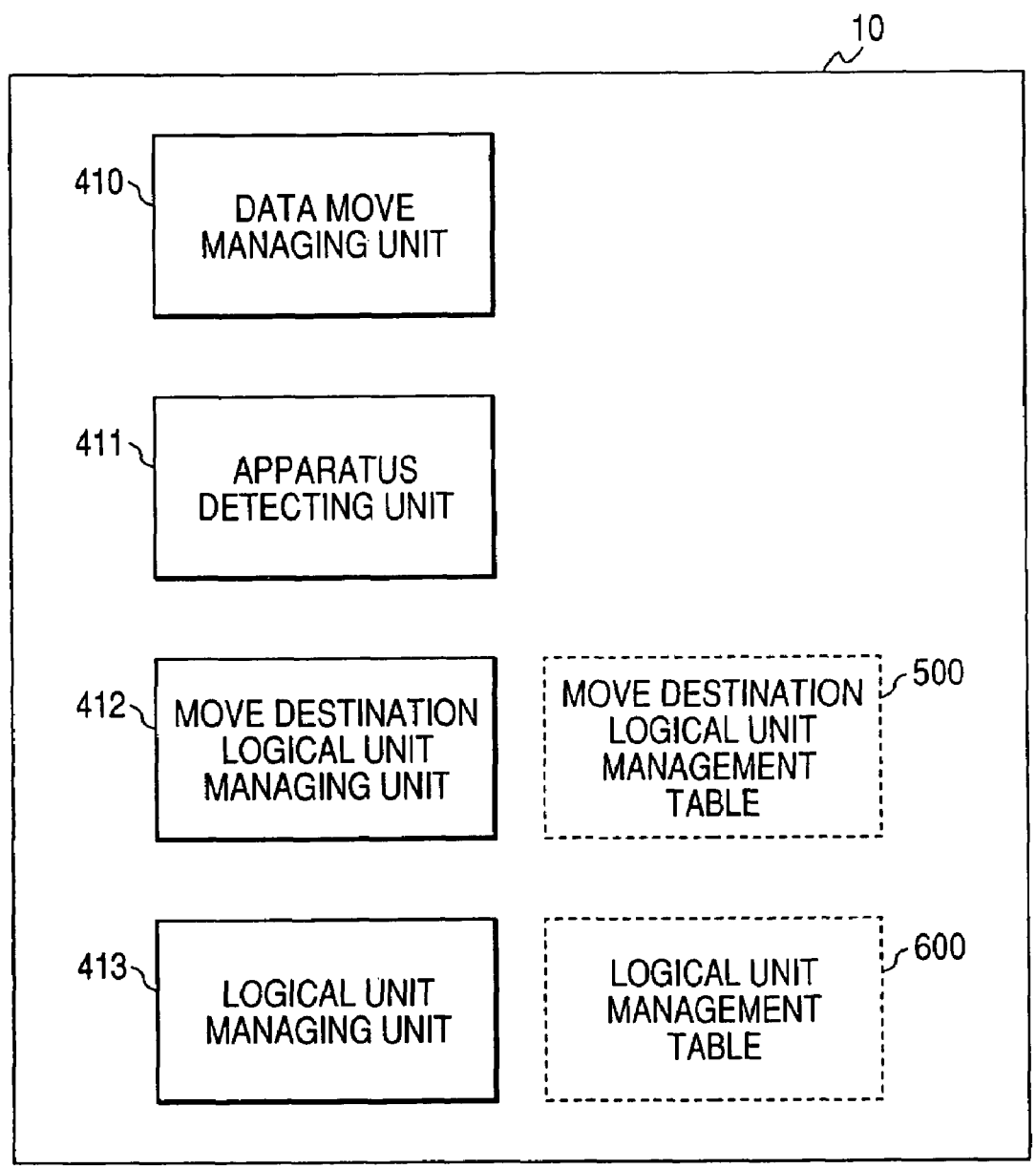
FIG. 4 is a diagram for showing functions of the disk array apparatus 10 explained as an embodiment of the present invention.

As to the above-explained system, FIG. 4 shows various sorts of functions employed in the disk array apparatus 10. In FIG. 4, a data move managing unit 410 judges as to whether or not necessary storage expiration of data which has been stored in the logical unit (first logical unit) is expired after the first guarantee expiration. Then, in the case that the necessary storage expiration of the data which has been stored in the logical unit (first logical unit) is expired after the first guarantee expiration, the data move managing unit 410 transfers the data stored in the logical unit (first logical unit) via the IP network 60 to the logical unit (second logical unit) having the second guarantee expiration after the first guarantee expiration.

As previously explained, since the data which has been stored in the logical unit (first logical unit) is transferred to the logical unit (second logical unit) of another disk array apparatus 10 provided on the IP network 60, such a term can be extended during which the data stored in the logical unit (first logical unit) of the disk array apparatus 10 of the data transfer source can be managed under safe condition. Also, in the case that necessary storage expiration is expired after the first guarantee expiration of the logical unit (first logical unit), the data move managing unit 410 may alternatively transfer the data which has been stored in the logical unit (first logical unit) with respect to such a logical unit (second logical unit) having a second guarantee expiration subsequent to the above-explained necessary storage expiration among the logical units (second logical units) of other disk array apparatus 10. In this alternative case, the data move managing unit 410 may manage the data which has been stored in the logical unit (first logical unit) of the disk array apparatus 10 of the data transfer source under safe condition until the necessary storage expiration thereof.

In order to manage data under safe condition, even when the data is transferred under any of the above-described conditions, the data move managing unit 410 executes the transfer operation of the data which has been stored in the logical unit (first logical unit) before the guarantee expiration (first guarantee expiration) of this logical unit (first logical unit) is expired.

The apparatus detecting unit 411 detects other disk array apparatus 10 which are present on the IP network 60. This apparatus detecting operation by the apparatus detecting unit 411 is carried out by way of, for example, either a broadcasting operation or a multi-casting operation with respect to the IP network 60 so as to request a response sent from an iSCSI device of a communication counter party. Alternatively, in the case that an iSNS (Internet Storage Name Server) may be used on the IP network 60, the apparatus detecting unit 44 may perform the above-described apparatus detecting operation by executing a discovery process in accordance with the iSNS.

The move destination logical unit managing unit 412 (second guarantee expiration managing unit) manages the move destination logical unit management table 500. The move destination logical unit management table 500 is stored in, for example, the memory 13, or the hard disk drive 18.

FIG. 5 shows an example of the above-explained move destination logical unit management table 500. In this move destination logical unit management table 500, an information has been registered. This information is related to the logical unit (second logical unit) of another disk array apparatus 10, which may constitute a move destination candidate of the data which has been stored in the logical unit (first logical unit). In this drawing, an apparatus ID which has been applied to the disk array apparatus 10 constituting the move destination candidate is set to a column 531 of the apparatus ID. As this apparatus ID, for example, an IP address; a combination between an IP address and a communication port ID provided on the side of another disk array apparatus 10 used to access a logical unit; an iSCSI-name (iSCSI name); and an apparatus number which has been applied to the disk array apparatus 10 when the manufacturer thereof ships this disk array apparatus 10 are employed. An LUN which has been applied to this logical unit is set to a column 532 of LUN.

To a column 533 of an emulation type, an emulation type of this logical unit is set. An emulation type implies information indicative of a specification of a logical unit. For instance, a storage capacity, a track size, a cylinder number, a maximum block number, and the like are set every emulation type to the emulation type column 533.

A storage capacity of this logical unit is set to a storage capacity column 534 of the move destination logical unit management table 500. To a format day/time column 535, day and time when this logical unit has been formatted (initialized) are set. It should also be noted that when a logical unit has not yet been formatted, this format day/time column 535 becomes blank.

A guarantee term (second guarantee term) is set to a guarantee term column 536, which can guarantee that the logical unit (second logical unit) stores thereinto data under normal condition. This guarantee term is determined based upon, for example, the life period of the hard disk drive 18. In a case that the logical unit (second logical unit) is constituted by employing storage areas of plural sets of the hard disk drives 18, for instance, an averaged value of life periods of the respective hard disk drives 18 is set as this guarantee term. Guarantee expiration (second guarantee expiration) is set to a guarantee expiration column 537, which may guarantee that a logical unit stores therein data under normal condition. The guarantee expiration (second guarantee expiration) may be calculated by adding the guarantee term (second guarantee term) set to the guarantee term column 536 to the day/time set to the format day/time. It should also be noted that when format day/time cannot be acquired from another disk array apparatus 10, a value is set to the guarantee expiration column 537, this value being calculated by adding the guarantee term (second guarantee term) set to the guarantee term column 536 to a day/time when a second storage area of another disk array apparatus 10 can be accessed.

Figure 6:
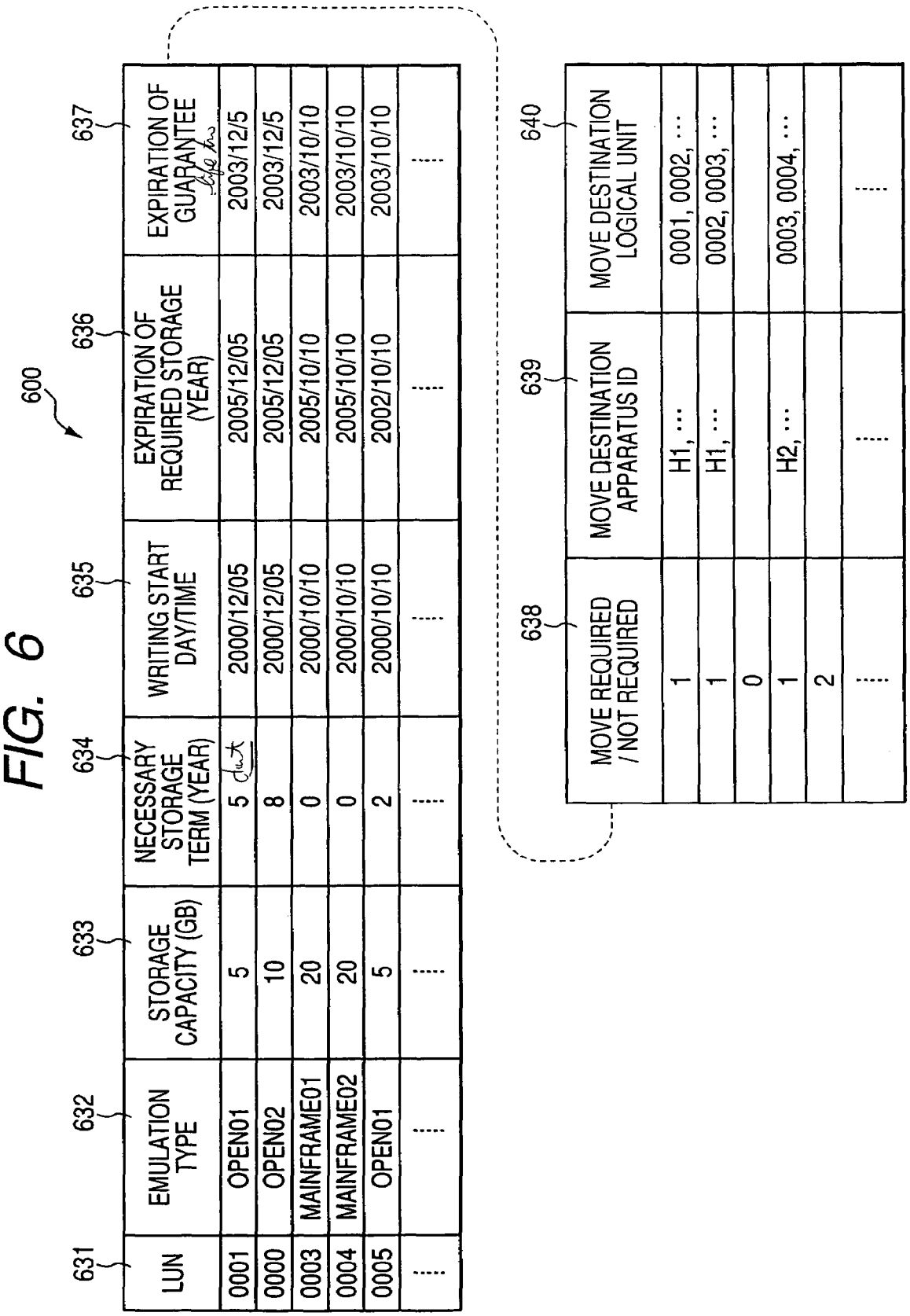
FIG. 6 is a diagram for representing a logical unit management table 600 explained as an embodiment of the present invention.

The logical unit managing unit 413 (necessary storage expiration managing unit, first guarantee expiration managing unit) shown in FIG. 4 manages a logical unit management table 600. FIG. 6 shows an example of the logical unit management table 600. The logical unit management table 600 is stored in, for example, the memory 13, or the hard disk drive 18. Information related to a logical unit (first logical unit) has been registered in the logical unit management table 600. In this drawing, an LUN which has been applied to this logical unit (first logical unit) is set to an LUN column 631. An emulation type of this logical unit (first logical unit) is set to an emulation type column 632. A storage capacity of this logical unit (first logical unit) is set to a storage capacity column 633.

A necessary storage term is set to a necessary storage term column 634, and this necessary storage term corresponds to a term that data stored in this logical unit (first logical unit) is required to be stored under safe condition. A day/time when data was firstly written in this logical unit (first logical unit) is set to a writing start day/time column 635. Necessary storage expiration is set to a necessary storage expiration column 636, and this necessary storage expiration corresponds to such an expiration that data stored in this logical unit (first logical unit) is required to be stored under safe condition. The necessary storage expiration may be calculated by adding the value set to the necessary storage term column 634 to the day/time set to the writing start day/time column 635.

Guarantee expiration (first guarantee expiration) is set to a guarantee expiration column 637, which corresponds to such a guarantee expiration that this logical unit (first logical unit) can store data under normal condition. The guarantee expiration (first guarantee expiration) of each of the logical units may be calculated by adding the guarantee term (first guarantee term) to the day/time when this logical unit was formatted. This first guarantee term implies a term that this logical unit (first logical unit) can store the data under normal condition.

To a move required/not required column 638, a flag (0: move is required, 1: move is not required) is set. This flag indicates as to whether or not data which has been stored in a logical unit (first logical unit) is required to be moved to another logical unit (second logical unit) of another disk array apparatus 10. A value of this flag is determined by comparing the necessary storage expiration set to the necessary storage expiration column 636 of the logical unit management table 600 with the guarantee expiration (first guarantee expiration) set to the guarantee expiration column 637. In the case that the necessary storage expiration is expired after the guarantee expiration (first guarantee expiration), "1" corresponding to the flag for indicating that move is required is set to the move required/not required column 638. Also, in the case that the necessary storage expiration is expired before the guarantee expiration (first guarantee expiration), "0" corresponding to the flag for indicating that move is not required is set to the move required/not required column 638. It should also be noted that as to the logical unit (first logical unit) which is not used, "2" is set to the move required/not required column 638, "2" corresponding to a flag for indicating that this logical unit is an empty logical unit. When another disk array apparatus 10 selects a logical unit of a move destination, as to such a logical unit that "2" has been set to the move required/not required column 638, this disk array apparatus 10 can judge that this logical unit may be utilized as a logical unit of a move destination.

An apparatus ID of another disk array apparatus 10 having a selected logical unit is set to a move destination apparatus ID column 639. As this apparatus ID, for example, an IP address (otherwise, combination between IP address and communication port ID provided on the side of another disk array apparatus 10 used to access to logical unit), an iSCSI-name (iSCSI name), and an apparatus number may be used. This apparatus number is applied to the disk array apparatus 10 when the manufacture thereof ships this disk array apparatus 10.

A logical unit number (LUN) of such a logical unit (second logical unit) which may constitute a candidate of a move destination among logical units (second logical unit) which have been registered in the move management table 500 is set to a move destination logical unit column 640. The logical unit management unit 413 selects such a logical unit which may constitute a candidate of a move destination from among the logical units (second logical units) which have been registered in the move destination logical unit management table 500 as to each of the logical units (first logical units) to the move required/not required column 638 of which the move required "1" has been set, among the logical units (first logical units) which have been registered in the logical unit management table 600.

In this case, a fact as to whether or not a logical unit (second logical unit) which has been registered in the move destination logical unit management table 500 can constitute a candidate of a move destination is determined by judging as to whether or not guarantee expiration (second guarantee expiration) of the logical unit which has been registered in the move destination logical unit management table 500 is expired after the guarantee expiration (first guarantee expiration) of the logical unit (first logical unit) of the logical unit management table 600. In other words, the logical unit managing unit 413 selects a logical unit (second logical unit) as the candidate of the move destination, the guarantee expiration (second guarantee expiration) of which is expired after the guarantee expiration (first guarantee expiration), from the among logical units (second logical units) which have been registered in the move destination logical unit management table 500. It should also be noted that when the necessary storage expiration is expired after the guarantee expiration (second guarantee expiration), a data which has been again thereafter stored in the logical unit (second logical unit) must be transferred to a logical unit having a guarantee expiration which is expired later than the second guarantee expiration at a time instant before the second guarantee expiration has elapsed. As previously explained, as the condition for selecting the candidate of the move destination, among the logical units (second logical units) which have been registered in the move destination logical unit management table 500, a logical unit (second logical unit) may be selected as the candidate of the move destination, the guarantee expiration (second guarantee expiration) of which is expired after the necessary storage expiration set to the necessary storage expiration column 636 of the logical unit management table 600.

A total number of logical unit (second logical unit) which is selected by the logical unit managing unit 413 is not always a single logical unit. That is to say, as to the logical unit (first logical unit) which has been registered in the logical unit management table 600, a plurality of logical units (second logical units) may be alternatively selected from the move destination logical unit management table 500. Conversely, there is a certain possibility that none of such a logical unit (second logical unit) which may constitute the candidate of the move destination is selected. In this case, both the move destination apparatus ID column 639 and the move destination logical unit column 640 become blank columns.

It should also be noted that the various sorts of functions shown in FIG. 4 have been executed by the disk array apparatus 10 in the above descriptions. Alternatively, these functions may be carried out by an apparatus (will be referred to as "managing server 30" hereinafter, see FIG. 1) other than the disk array apparatus 10 connected to the IP network 60. In this alternative case, the managing server 30 may also store thereinto both the move destination logical unit management table 500 and the logical unit management table 600. The managing server 30 transmits a message to the disk array apparatus 10 in the case that necessary storage expiration of a logical unit (first logical unit) of a certain disk array apparatus 10 is expired after the guarantee expiration (first guarantee expiration) of this logical unit (first logical unit), otherwise, in the case that the second guarantee expiration thereof is expired after the necessary storage expiration. This message instructs that data stored in this logical unit is transferred to another logical unit (second logical unit) of another disk array apparatus 10 which owns a guarantee expiration (second guarantee expiration) expired after the guarantee expiration (first guarantee expiration), otherwise, the guarantee expiration (second guarantee expiration) of which is expired after the necessary management expiration. The disk array which has received the message transfers the data in accordance with the message. When the storage system 1 is arranged in such a manner that the above-described functions are carried out by the managing server 30 as explained above, as to the process operations executed by the managing server 30, the workload to be processed by the disk array apparatus 10 may be reduced.

Processing Operations of Storage System 1

Next, a description is made of process operations which are executed in the storage system 1 according to this embodiment so as to realize the above-explained data managing system.

Figure 7A:
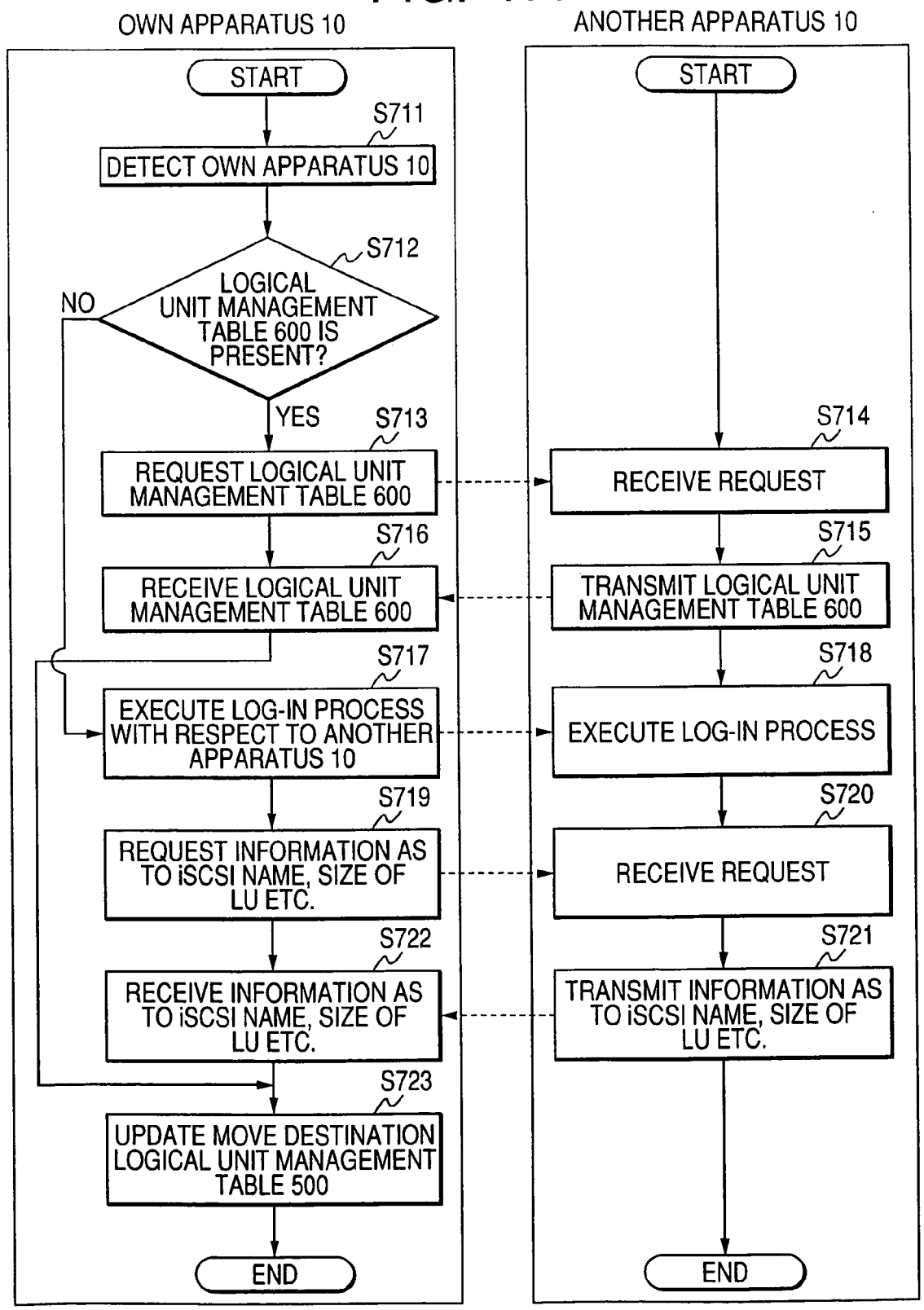
FIG. 7A is a flow chart for describing a process operation for updating the move destination logical unit management table 500 explained as an embodiment of the present invention.

FIG. 7A is a flow chart for explaining process operations related to an updating operation of the move destination unit management table 500, which is carried out by the data move managing unit 410 of the disk array apparatus 10. The apparatus detecting unit 411 of the disk array apparatus 10 (will also be referred to as "own apparatus 10" hereinafter) detects another disk array apparatus 10 (will also be referred to as "another apparatus 10" hereinafter) which is connected to the IP network 60 (step S711). It should be understood that a disk array apparatus 10 detected by the apparatus detecting unit 411 may be limited to a predetermined range in order that such disk array apparatus 10 may not be detected which need not be originally detected. To this end, for example, while such an information for specifying iSCSI-name (iSCSI name) and an IP address of such a disk array apparatus 10 is stored into the disk array apparatus 10, which may constitute a detection subject, the apparatus detecting unit 411 may alternatively detect only such a disk array apparatus 10 specified by this stored information.

When another apparatus 10 is detected by the apparatus detecting unit 411, the data move managing unit 410 of the own apparatus 10 checks as to whether or not the detected another apparatus 10 corresponds to such a disk array apparatus for managing the logical unit management table 600 (step S712). In this step, this judgement may be carried out by, for example, such a manner that the own apparatus 10 inquires as to whether or not the logical unit management table 600 is managed by another apparatus 10. In this alternative case, for instance, the own apparatus 10 may make this inquiry via the IP network 60 in accordance with the iSCSI protocol. Also, such a fact as to whether or not the detected another apparatus 10 corresponds to the disk array apparatus for managing the logical unit management table 600 may be judged by previously storing such an information into the respective disk array apparatus 10 without using the iSCSI protocol, while this information indicates as to whether or not another apparatus 10 manages the logical unit management table 600. Furthermore, such a fact may also be judged by checking as to whether or not a disk array apparatus 10 corresponds to such a disk array apparatus 10 manufactured by the same maker, or corresponds to such a disk array apparatus 10 having the same model number.

In a step S712, when the apparatus detecting unit 411 judges that another apparatus 10 corresponds to such a disk array apparatus for managing the logical unit management table 600 ("YES" of step S712), the data move managing unit 410 requests the detected another apparatus 10 to transmit the logical unit management table 600. Then, another apparatus 10 transmits the logical unit management table 600 to the own apparatus 10 in response to the above-explained response (steps S714 and S715). The own apparatus 10 receives the transmitted logical unit management table 600 (step S716).

FIG. 7B is a flow chart for explaining a process operation which is executed in accordance with the iSCSI protocol while the own apparatus 10 acquires the logical unit management table 600 itself, or acquires a portion of information registered in the logical unit management table 600 from another apparatus 10. In such a case that the own apparatus 10 requests either a portion of the information stored in the logical unit management table 600 or the logical unit management table 600 itself from another apparatus 10, the own apparatus 10 firstly executes a log-in process operation with respect to another apparatus in accordance with the log-in sequence of the iSCSI protocol (steps S751 to S754).

Next, a procedure at the SCSI protocol level is commenced. First, a READ command of the SCSI protocol is transmitted from the own apparatus 10 to another apparatus 10 (step S755). When the above-described READ command is received by another apparatus 10 (step S756), another apparatus 10 checks as to whether or not this READ command corresponds to such a command for requesting either the logical unit management table 600 itself or a portion of the information registered in the logical unit management table 600 (step S757). This judgement is carried out by checking information which has been set to a predetermined field of the READ command. In this case, when the above-described READ command is such a command which requires either the logical unit management table 600 itself or a portion of the information registered in the logical unit management table 600 (step S757: YES), another apparatus 10 transmits either the logical unit management table 600 itself or a portion of the information registered in the logical unit management table 600 with respect to the own apparatus 10 (step S758). Then, the own apparatus 10 receives either the transmitted logical unit management table 600 or a portion of the information registered in the logical unit management table 600 (step S759). In the above-explained step S757, when the above-described READ command is not such a command which requires either the logical unit management table 600 itself or a portion of the information registered in the logical unit management table 600 (step S757: NO), another apparatus 10 executes a process operation of the READ command in accordance with the normal SCSI protocol (step S760).

In the step S712 of FIG. 7A, in the case that the apparatus detecting unit 411 judges that another apparatus 10 corresponds to such a disk array apparatus which does not manage the logical unit management table 600 (step S712: NO), the own apparatus 10 executes a log-in process operation in accordance with the iSCSI protocol with respect to the detected another apparatus 10 (steps S717 and S718). After the log-in process operation, the own apparatus 10 requests another apparatus 10 to send information related to an iSCSI name, a size of a logical unit, and the like (steps S719 and S720), and the own apparatus 10 receives such an information transmitted from another apparatus 10 in response to the request (steps S721 and S722).

In a step S723, the own apparatus 10 updates the move destination logical unit management table 500 based upon the logical unit management table 600 and the information as to the iSCSI name and the size of the logical unit, which are received from the detected another apparatus 10. It should also be noted that another apparatus 10 corresponds to such a disk array apparatus 10 which is supplied from a maker different from the maker of this another apparatus 10, there are some possibilities that information related to a format day/time, a guarantee term, and guarantee expiration cannot be acquired from another apparatus 10. In such a case, the own apparatus 10 predicts that, for instance, such a day/time is equal to guarantee expiration (second guarantee expiration) of a logical unit of another apparatus 10, while this day/time is calculated by adding the life period of another apparatus 10 to such a day/time when the own apparatus 10 can access the logical unit of another apparatus 10. When the own apparatus 10 performs this assumption, the own apparatus 10 notifies such a message that such an assumption has been carried out to the output apparatus 16 such as a display, and prompts a user, or the like to enter such a confirmation as to whether or not the data is moved to the input apparatus 15 when moving of this data is carried out. Only when the confirmation is entered, the own apparatus 10 transfers the data.

As previously described, in each of these disk array apparatus 10 which are connected to the IP network 60, the content of the move destination logical unit management table 500 is updated. It should also be noted that the updating operation of the move destination logical unit management table 500 is properly carried out in real time, or at prescheduled timing.

FIG. 8 is a flow chart for explaining both a process operation for judging as to whether or not data stored in the logical unit (first logical unit) of the disk array apparatus 10 is required to be moved, and another process operation for selecting such a logical unit (second logical unit) which constitutes a candidate of a move destination as to the logical unit (first logical unit) storing the data the movement of which has been judged to be required.

The data move managing unit 410 of the own apparatus 10 monitors that data which has been stored in each of the logical units (first logical units) employed in the own apparatus 10 is required to be moved to another logical unit (second logical unit) of another apparatus 10 (step S811). In this step S811, the data monitoring operation is properly carried out in real time, or at prescheduled timing. The data move managing unit 410 checks as to whether or not necessary storage expiration of data which has been stored in a storage area of a logical unit (first logical unit) is expired after guarantee expiration (first guarantee expiration) of this logical unit (first logical unit). Based upon a checked result, the data move managing unit 410 determines as to whether or not movement as to the data stored in this logical unit (first logical unit) is required. The data move managing unit 410 sets "1" to the move required/not required column 637 of the logical unit management table 600 of the logical unit (first logical unit) which has been judged as "move being required", and this flag indicates that the data is required to be moved (step S812).

Next, as to such a logical unit (first logical unit) that the flag "1" indicative of "move being required" has been set to the move required/not required column 637 of the logical unit management table 600, the data move managing unit 410 selects such a logical unit (second logical unit) which may constitute a candidate of a move destination (step S813). As previously explained, the selecting operation of the logical unit (second logical unit) is carried out by comparing the guarantee expiration (first guarantee expiration) with the guarantee expiration (second guarantee expiration). The first guarantee expiration has been set to the guarantee expiration column 637 of the logical unit (first logical unit) which has been judged as "move being required." The second guarantee expiration has been set to the guarantee expiration column 537 of the logical unit (second logical unit) which has been registered in the move destination logical unit management table 500. As previously explained, the selecting operation of the logical unit (second logical unit) which may constitute the candidate of the move destination may be carried out by comparing the necessary storage expiration with the guarantee expiration (second guarantee expiration). The necessary storage expiration has been stored in the necessary storage expiration column 636 of each of the logical units which have been judged as "move being required." The second guarantee expiration has been set to the guarantee expiration column 537 of each of the logical units which have been registered in the move destination logical unit management table 500.

Based upon the above-described comparing operation, the data move managing unit 410 selects such a logical unit that the second guarantee expiration is expired after the first guarantee expiration (otherwise, second guarantee expiration is expired after necessary storage expiration) from the above-described move destination logical unit management table 500. Then, the data move management unit 410 sets a logical unit number (LUN) of the selected logical unit (second logical unit) to the move destination logical unit column 640 of the logical unit management table 600. Also, the data move managing unit 410 sets an apparatus ID of another apparatus 10 which provides the selected logical unit (second logical unit) to the move destination apparatus ID column 639 of the logical unit management table 600.

In the above description, the disk array apparatus 10 automatically has executed the judging operation as to whether or not the move of the data is required, and the selecting operation as to whether or not the move destination of the logical unit is selected. Alternatively, both the judging operation and the selecting operation may be manually set by a user, or the like by operating both the input apparatus 15 and the output apparatus 16 as user interfaces. When the setting operation is manually carried out, the user, or the like may set values by manipulating the input apparatus 15 to the move required/not required column 638 of the logical unit management table 600, the move destination apparatus ID column 639 thereof, and the move destination logical unit column 640 thereof, respectively, which are displayed on the output apparatus 16 such as the display. It should also be noted that for the sake of convenience as to the input operation by the user, or the like, the content of the move distance logical unit management table 500 may be displayed on the output apparatus 15. In this case, the user, or the like may alternatively set the values to all of the move required/not required column 638, the move destination apparatus ID column 639, and the move destination logical unit column 640, or may manually set the value only to the move required/not required column 638. Moreover the user may manually set the value only to the move required/not required column 638 and the move destination apparatus ID column 639. Since such various setting methods are prepared, the setting operation suitable for the operation mode of the user, or the like may be set.

Now, in the case that a value has been set only to the move required/not required column 638, the data move managing unit 410 automatically sets both the content of the move destination apparatus ID column 639 and the content of the move destination logical unit column 640. Also, in the case that values have been set only to the move required/not required column 638, and the move destination apparatus ID column 639, the data move managing unit 410 automatically sets the logical unit of the disk array apparatus 10 which has been set to the move destination apparatus ID column 639 to the move destination logical unit column 640. It should also be understood that a concrete process of a system capable of automatically selecting a candidate of a move destination is similar to that of the above-explained case.

FIG. 9 is a flow chart for explaining a process operation related to a move of data, which is carried out in each of the disk array apparatus 10 connected to the IP network 60. This data moving process operation is properly carried out in either real time or at prescheduled timing. The data move managing unit 410 refers to the move required/not required column 637 of the logical unit management table 600, and determines such a logical unit (second logical unit) of another apparatus 10 as to another logical unit (first logical unit) in which a flag "1" indicative of "move being required" has been set. This second logical unit constitutes a move destination of data which has been stored in this logical unit (first logical unit).

When the data move managing unit 410 determines the second logical unit of another apparatus 10, the data move managing unit 411 firstly checks as to whether or not a logical unit (second logical unit) which may constitute a candidate of a move destination has been set to the move destination logical unit of the logical unit management table 600 (step S911). When the candidate of the logical unit (second logical unit) which may constitute the move destination has been set (step S911: YES), the data move managing unit 410 checks as to whether or not the logical unit (second logical unit) which has been set to the move destination logical unit column 640 corresponds to a single logical unit. In the case that only one logical unit (second logical unit) has been set to the move destination logical unit column 640 (step S912: YES), the data move managing unit 410 determines this single logical unit (second logical unit) as the logical unit of the move destination (step S913).

In the step S912, when a plurality of logical units (second logical units) have been set to the move destination logical unit column 640 (step S912: NO), the data move managing unit 410 focuses on a logical unit (second logical unit) of a move destination under predetermined condition (step S914). As this predetermined condition, for instance, the following conditions may be conceived: a condition as to whether or not this guarantee expiration (second guarantee expiration) is expired after necessary storage expiration of a logical unit (first logical unit) of a move source [note that this condition is applied to such a case that selecting condition of candidate corresponds to such a condition that guarantee expiration (second guarantee expiration) is expired after guarantee expiration (first guarantee expiration)]; a condition as to whether or not this logical unit (second logical unit) has a sufficiently large remaining capacity capable of storing data which has been stored in the logical unit (first logical unit) of the move source (remaining capacity is acquired, for example, by making inquiry from own apparatus 10 to another apparatus 10); and a condition as to whether or not an emulation type of a logical unit set to the move destination logical unit column 640 is identical to the emulation type of the logical unit of the move source. In such a case that logical units (second logical units) which have been selected based upon the above-described predetermined condition must be furthermore focused on a smaller number of such second logical units, the data move managing unit 410 focuses on such a logical unit (second logical unit) of a move destination by being selected from the plural logical units which have been selected under the predetermined condition for, for example, the largest storage capacities, the latest expiration of guarantee expiration (second guarantee expiration).

It should also be noted that the number of logical units (second logical units) which are finally focused on may become single, or plural. In the case that there are plural logical units which constitute candidates of move destinations, while the logical units which constitute the candidates of the move destinations are informed to the output apparatus 16, the user, or the like may designate the logical unit from the input apparatus 15. As a consequence, such a logical unit which may constitute the candidate of the move destination may be set in response to needs of the user, or the like.

On the other hand, in the step S911, in the case that the candidate of the logical unit (second logical unit) which may constitute the move destination is not set to the move destination logical unit column 640 of the logical unit management table 600 (step S911: NO), the data move managing unit 410 inquiries another apparatus 10 which has been detected by the apparatus detecting unit 411 so as to acquire information related to the logical unit (second logical unit) of another apparatus 10 (steps S915 to S918). When the data move managing unit 410 acquires the information related to the logical unit (second logical unit), the data move managing unit 410 determines such a logical unit of a move destination based upon the acquired information (step S919).

When this logical unit of the above destination is determined, the data move managing unit 410 focuses on the logical unit (second logical unit) of the move destination based upon the following predetermined conditions: a condition as to whether or not the guarantee expiration (second guarantee expiration) thereof is expired after the necessary storage term of the logical unit (first logical unit) of the move source (otherwise, whether or not second guarantee expiration is expired after first guarantee expiration of logical unit of move source); a condition as to whether or not this second logical unit owns such an empty storage capacity larger than, or equal to data size of data which has been stored in the logical unit (first logical unit) of the move source; and a condition as to whether or not an emulation type of this second logical unit is identical to an emulation type of the logical unit (first logical unit) Similar to the above-described process operation, in the case that logical units (second logical units) which have been selected based upon the above-described predetermined condition must be furthermore focused on a smaller number of such second logical units, the data move managing unit 410 focuses on such a logical unit (second logical unit) of a move destination by being selected from the plural logical units which have been selected under the predetermined condition based upon the following condition for, for example, the largest storage capacities, the latest expiration of the guarantee expiration (second guarantee expiration).

It should also be noted that in the case that there are plural logical units which constitute candidates of move destinations, while both information related to the respective logical units and the logical units which constitute the candidates of the move destinations are informed to the output apparatus 16, the user, or the like may enter information for specifying the logical unit from the input apparatus 15. As a consequence, such a logical unit which may constitute the candidate of the move destination may be set in response to needs of the user, or the like.

When the logical unit (second logical unit) of the move destination is determined in the above-explained manner, the data move managing unit 410 transfers the data which has been stored in the logical unit (first logical unit) of the move source to such a logical unit (second logical unit) which has been determined as the move destination (step S920). To the data which is transferred, an LUN of a logical unit (second logical unit) which constitutes the transfer destination of this data is attached. Alternatively, in order that the user, or the like finally confirms the logical unit (second logical unit) of the move destination before the data transfer operation is carried out, the logical unit (second logical unit) of the move destination may be informed to the output apparatus 16, so that the user, or the like is prompted to enter such a confirmation as to whether or not the data transfer operation is carried out. As a result, the user, or the like may finally make such a confirmation, so that it is possible to avoid that the data is transferred irrespective of, for example, operation condition by the user.

When the data move managing unit 410 employed in the disk array apparatus 10 having the logical unit (second logical unit) of the move destination receives the transmitted data, this data move managing unit 410 stores the received data into the relevant logical unit (second logical unit) having the LUN attached to this received data (step S921). The data move managing unit 410 of the disk array apparatus 10 of the move destination updates the content of the necessary storage term column 634 contained in the logical unit management table 600 of the disk array apparatus 10 of the move destination in order that the necessary storage term of the moved data can be managed in a correct manner (step S922). Concretely speaking, the data move managing unit 410 employed in the disk array apparatus 10 having the logical unit (second logical unit) of the move destination sets such a value to the necessary storage term column 634 of the logical unit management table 600 of the move destination. This set value is calculated by subtracting such a term during which the above-explained moved data has been stored in the disk array apparatus 10 of the move source from the content of the necessary storage term of the logical unit management table 600 of the move source. In this case, the term during which the above-explained moved data has been stored in the disk array apparatus 10 of the move source may be obtained as such a term defined from, for example, the day/time set to the writing start day/time column 635 of the logical unit management table 600 up to day/time when the above-described data was moved.

As previously described in detail, in accordance with the storage system of the present invention, in the case that the necessary storage expiration equal to the expiration which requires that the data stored in the storage area (first storage area) of the disk array apparatus 10 is stored under the safe condition is ended after the first guarantee expiration of the relevant logical unit, the above-explained data stored in the first storage area is transferred in either the automatic mode or the semi-automatic mode to another storage area (second storage area) of another disk array apparatus 10 having the second guarantee expiration expired after the first guarantee expiration (otherwise, after necessary storage expiration). As a result, with respect to such a term during which the data is required to be managed under safe condition, the data can be managed under safe condition.

Also, since the data transfer operation is carried out via the IP network 60, the process operation can be quickly carried out, as compared with such a case that the back-up data is stored in the magnetic tape, or the like. Also, since such an apparatus as a magnetic tape apparatus for reading/writing data from a storage medium such as a magnetic tape is not separately employed, the management load and the cost can be decreased. Further, since the installation space for installing a magnetic tape apparatus, or the like is no longer required, space saving effects may be achieved.

Moreover, in accordance with the present invention, as explained above, in order to manage the data under safe condition as to the necessary storage expiration, the second storage area of another disk array apparatus 10 is utilized. In other words, in accordance with the present invention, the storage areas provided by the respective disk apparatus 10 which are connected to the storage system 1 can be effectively used as the entire storage area of the storage system 1.

While the present invention has been described by exemplifying one embodiment mode thereof, the descriptions of this embodiment are provided in order to easily understand the present invention, but do not restrict the present invention. Therefore, the present invention may be changed and altered without departing from the gist of the present invention, and apparently, equivalents thereof are involved in the present invention.

What is claimed is:

1. A storage control apparatus control method for reading/writing data with respect to a storage device in response to a data input/output request transmitted from an information processing apparatus, said storage control apparatus being in a plurality of storage control apparatuses communicatably connected via a network to each other, comprising the steps of:

storing a first period during which data is required to be stored, said data being stored in a first storage area corresponding to a storage area of said storage device to which said storage control apparatus reads/writes the data, the data having an expiration period;

storing a first physical life time period in which said first storage area can store the data without expiration;

storing a second physical life time period in which a second storage area can store the data without expiration;

when a condition is satisfied, said condition being before an end of the first physical life time period and before an end of the data expiration period and before an end of the second physical life time period, transferring said data stored in said first storage area to said second storage area;

relating a remaining useful life time period of the data with the second storage area; and storing the relationship.

2. A method as claimed in claim 1, further comprising the steps of:

when said data useful life time period expires after said first physical life time period of said first storage area, selecting said second storage area having said second physical life time period which expires after said data useful life time period, and transferring said data stored in said first storage area to said selected second storage area.

3. A method as claimed in claim 1, wherein said data transfer is performed before said first physical life time period expires.

4. A method as claimed in claim 1, wherein said first period corresponds to a term during which said first storage control apparatus is operated under a normal condition and data is stored without degradation, and said second physical life time period corresponds to time period during which said second storage control apparatus is operated under a normal condition and data is stored without degradation.

5. A method according to claim 1, further comprising the step of:

selecting a storage control apparatus from among said plurality of storage control apparatuses communicably connected via said network as another storage control apparatus having said second storage area.

6. A method as claimed in claim 5, wherein said method further comprises the step of:

detecting said another storage control apparatus connected to said network via an apparatus detecting unit, wherein said second storage area corresponds to the storage area of said another storage control apparatus detected by said apparatus detecting unit.

7. A method as claimed in claim 6, wherein said apparatus detecting unit detects said another storage control apparatus connected to said IP network by a discovery process in accordance with an iSNS (Internet Storage Name Server) protocol.

8. A method as claimed in claim 5, wherein said data transfer is carried out in accordance with the iSCSI protocol.

9. A method as claimed in claim 8, further comprising the steps of:

storing information for specifying said storage control apparatus selected as said another storage control apparatus, and executing said data transfer operation with respect to said second storage area of said another storage control apparatus specified based upon said information stored thereinto.

10. A method as claimed in claim 5, wherein said data transfer is carried out in accordance with the iSCSI protocol.

11. A method as claimed in claim 10, further comprising the steps of:

storing information for specifying said storage control apparatus selected as said another storage control apparatus, and executing said data transfer operation with respect to said second storage area of said another storage control apparatus specified based upon said information stored thereinto.

12. A control method for a storage system containing a plurality of storage control apparatus for reading/writing data with respect to a storage device in response to a data input/output request transmitted from an information processing apparatus, which are communicatably connected via a network to each other, said control method comprising the steps of:

storing a first period during which data is required to be stored, said data being stored in a first storage area corresponding to a storage area of said storage device to which said storage control apparatus reads/writes the data, said data having an expiration period;

storing a first physical life time period in which said first storage area can store the data without expiration;

storing a second physical life time period in which a second storage area can store the data without expiration;

selecting said second storage before an end of the first physical life time period and before an end of the data expiration period and before an end of the second physical life time period;

transferring said data stored in said first storage area to said selected second storage area;

relating a remaining useful life time period of the data with the second storage area; and storing the relationship.

13. A method according to claim 12, wherein said step of selecting said storage area includes selecting a storage control apparatus from among said plurality of storage control apparatuses communicably connected via said network as another storage control apparatus having said second storage area.

14. A method as claimed in claim 12, further comprising the steps of:

when said data useful life time period expires after said first physical life time period of said first storage area, selecting said second storage area having said second physical life time period which expires after said data useful life time period, and transferring said data stored in said first storage area to said selected second storage area.

15. A method as claimed in claim 12, wherein said data transfer is performed before said first physical life time period expires.

16. A method as claimed in claim 12, wherein said first period corresponds to a term during which said first storage control apparatus is operated under a normal condition and data is stored without degradation, and said second physical life time period corresponds to time period during which said second storage control apparatus is operated under a normal condition and data is stored without degradation.

17. A method as claimed in claim 13, wherein said method further comprises the step of:

detecting said another storage control apparatus connected to said network via an apparatus detecting unit, wherein said second storage area corresponds to the storage area of said another storage control apparatus detected by said apparatus detecting unit.

18. A method as claimed in claim 17, wherein said apparatus detecting unit detects said another storage control apparatus connected to said IP network by a discovery process in accordance with an iSNS (Internet Storage Name Server) protocol.

19. A control method for controlling a storage system containing a plurality of storage control apparatus for reading/writing data with respect to a storage device in response to a data input/output request transmitted from an information processing apparatus, which are communicatably connected via a network to each other, comprising:

storing by said storage control apparatus thereinto a first period equal to a predetermined period during which data is required to be stored, said data being stored in a first storage area corresponding to a storage area of said storage device to which said storage control apparatus reads/writes the data, the data having an expiration period;

storing by said storage control apparatus thereinto a first physical life time period equal to a physical life time during which said first storage area can store the data without expiration;

storing by said storage control apparatus thereinto a second physical life time period equal to a physical life time during which a second storage area can store the data without expiration;

when a condition is satisfied, said condition being before an end of the first physical life time period and before an end of the data expiration period and before an end of the second physical life time period, transferring by said storage control apparatus said data stored in said first storage area to said second storage area;

relating a remaining useful life time period of the data with the second storage area; and storing the relationship.

\* \* \* \* \*